United States Patent [19]

Ryan et al.

[11] Patent Number: 4,705,362

[45] Date of Patent: Nov. 10, 1987

[54] ACOUSTO-OPTIC TUNABLE FILTER WITH TWO ACOUSTIC CHANNELS

[75] Inventors: Frederick M. Ryan, Loyalhanna Township, Westmoreland County; Milton Gottlieb, Churchill Boro; Donald W. Feldman, Pittsburgh, all of Pa.

[73] Assignee: Westinghouse Electric Corp., Pittsburgh, Pa.

[21] Appl. No.: 881,579

[22] Filed: Jul. 2, 1986

Related U.S. Application Data

[63] Continuation of Ser. No. 657,925, Oct. 5, 1984, abandoned.

[51] Int. Cl.[4] ............................ G02B 5/20; G02F 1/11
[52] U.S. Cl. ..................................... 350/372; 350/358
[58] Field of Search .................. 350/358, 371–373, 350/96.13

[56] References Cited

U.S. PATENT DOCUMENTS

| 3,679,288 | 7/1922 | Harris | 350/358 |
| 3,759,603 | 9/1973 | Eschler | 350/358 |
| 4,052,121 | 10/1977 | Chang | 350/372 |
| 4,110,016 | 8/1978 | Berg et al. | 350/96.13 |
| 4,505,550 | 3/1985 | Steinbruegge | 350/372 |
| 4,514,056 | 4/1985 | Azgapetian | 350/372 |

FOREIGN PATENT DOCUMENTS

1078396  3/1984  U.S.S.R. ............................... 350/358

OTHER PUBLICATIONS

Applied Optics, vol. 15, No. 9, Sep. 1976, pp. 2250–2258, New York, US; T. Yano et al.: "Acoustooptic TeO2 Tunable Filter Using Far-Off-Axis Anisotropic Bragg Diffraction".
Pinnow et al "An Electro-Optic Tunable Filter", App. Phys. Letts. 3-79, pp. 391-393.
Lotspeich et al. "Electro-Optic Tunable Filter", Optical Engineering, 11/1981, pp. 830-836.
Harris et al "Acousto-Optic Tunable Filter", Jr. Optical Soc. America, vol. 59, 6-1969, pp. 744-747.
Steinbruegge et al "Automated Acusto-Optic Tunable Filter (AOTF) Infrared Analyzer", SPIE vol. 268, 1981, pp. 160-166.
Yariv, A., "Introduction to Optical Electronics", Holt, Rinehart & Winston, 1976, pp. 340-342.
Tsai et al, "Wide-Band Guided-Wave Acoustooptic Bragg Diffraction & Devices Using Multiple Tilted Surface Acoustic Waves", Proc. IEEE, 3-1976, pp. 318-328.
Feichtner et al, "Programmable Acoustooptic Filters—Characteristics & Potential Applications in Optical Computing", Proc. 1978 Intn. Optical Comp. Conf. Sep. 1978, pp. 55-66.
Adrianova et al, "Diffraction Modulator with Two Spatially Separated Oppositely Traveling Ultrasonic Waves in Lead Molybdate", Optics & Spectrosopy, 4-1976, pp. 426-429.

*Primary Examiner*—William H. Punter
*Attorney, Agent, or Firm*—M. S. Yatsko

[57] ABSTRACT

An acousto-optic tunable filter configuration and a method for the operation thereof, whereby the tuning range is extended. A non-collinear acousto-optic tunable filter crystal has a first transducer bonded to one transducer face of the crystal and a single transducer bonded on the opposite crystal face which crystal face is cut so as to be parallel to the first transducer. The first transducer operates at a center frequency $f_1$ and the second transducer operates at a center frequency $f_2$. By launching acoustic waves having a center frequency $f_1$ into the crystal from the crystal's first side acoustic waves propagate in a first direction such that the interaction of the acoustic wave with the light results in the absorption of a phonon. Acoustic waves having a center frequency $f_2$ are launched into the crystal from the crystal's second side and propagate in a second direction which is anti-parallel to the first direction such that the interaction with the light by the second series of acoustic waves results in the stimulated emission of a phonon.

2 Claims, 2 Drawing Figures

ACOUSTO-OPTIC TUNABLE FILTER WITH TWO ACOUSTIC CHANNELS

This application is a continuation of application Ser. No. 657,925, filed Oct. 5, 1984, and now abandoned.

BACKGROUND OF THE INVENTION

The present invention relates to an acousto-optic tunable filter (AOTF) configuration which extends the tuning range of the filter. Additionally, the invention provides a method for extending the tuning range of an acousto-optic tunable filter.

The term acousto-optic filter refers to the fact that in certain birefringent optical materials, a light beam propagating as an E-ray can, under certain conditions, be converted into an O-ray by interaction with, and diffraction from, an acoustic wave propagating in the same medium. This phenomenon has been utilized in producing narrow band optical filters, the peak transmission wavelength of which can be selected by properly choosing the frequency of the acoustic wave. The center wavelength of the passband of the acousto-optic filter is electronically tunable by changing the frequency of the acoustic wave within the crystal.

Two basic types of tunable acousto-optic filters have been constructed: collinear and non-collinear. A collinear acousto-optic filter is disclosed in U.S. Pat. No. 3,679,288 entitled "Tunable Acousto-Optic Method and Apparatus" by Stephen E. Harris. Harris was concerned primarily with the collinear filter, in which the incident and diffracted light beams inside the birefringent crystal are collinear with the acoustic beam. A diffracted light beam at the selected passband is separated from the incident light beam with a polarizing beam splitter. In the non-collinear filter, the light beams inside the birefringent crystal are non-collinear with the acoustic beam. U.S. Pat. No. 4,052,121 to Chang entitled "Noncollinear Tunable Acousto-Optic Filter", teaches that an electronically tunable optic filter with large angular aperture can be obtained by utilizing the interaction of optical and acoustic beams that propagate non-collinearly in an anisotropic medium. Incident light of one polarization is diffracted by the acoustic wave in an orthogonal polarization over an optical passband, the center of which can be tuned by changing the acoustic frequency. U.S. Pat. No. 3,679,288 and U.S. Pat. No. 4,052,121, which are identified above, are incorporated herein by reference as if the contents thereof were completely set forth herein.

Both collinear and non-collinear filters possess unique advantages and liabilities. In general, the collinear acousto-optic tunable filter will yield a higher resolution but the extraction of the filtered light output will require a polarizing beam splitter. The non-collinear acousto-optic tunable filter is often more convenient to use because there is some angular separation between the incident and the filtered light. It may be difficult to achieve high resolution with non-collinear filters of reasonable geometry, but for many applications, the achievable results are more than adequate. One such particularly useful application of the non-collinear acousto-optic tunable filter is described in U.S. Pat. No. 4,490,845 entitled "An Automated Acousto-Optic Infrared Analyzer System", which is assigned to the assignee of the present invention and incorporated herein by reference. This patent teaches an automated acousto-optic tunable filter infrared analyzer system usable in a variety of industrial and commercial control applications. The system relies upon a narrow passband tunable acousto-optic filter which is selectively tuned by predetermined RF signals to selectively transmit the narrow band-pass of interest which corresponds to a specific molecular species for identification and analysis. The system includes a microcomputer and associated memory functions to measure and compare detected signals from an infrared detector which converts the filtered infrared signal to an electrical signal. The memory provides control signals for the computer and for controlling the sequence and frequency of RF engergy applied to tune the filter. In this way, the near-to-mid range infrared can be analyzed for absorption bands corresponding to predetermined molecular species such as combustion product gases, and a feedback signal generated to control the combustion process.

The development of new efficient infrared acousto-optic materials such as thallium-arsenic-selenide ($Tl_3AsSe_3$) as described in U.S. Pat. No. 3,792,287; thallium-phosphorus-selenide per U.S. Pat. No. 3,929,970; and thallium-arsenic-sulfide per U.S. Pat. No. 3,799,659 all of which are owned by the assignee of the present invention and are incorporated herein by reference provide the possibility of operation over the near-to-mid infrared range of from about 1.3 micrometers to about 16 micrometers. The crystal $Tl_3AsSe_3$ (TAS) provides a relatively high figure of merit and transmits from 1.25 to 16 microns. In addition, the crystal symmetry of the TAS crystal makes it particularly suitable for use in non-collinear applications. While the TAS crystal possesses a relatively high figure of merit and extended transmission range, the optical wavelength range capability of the device is limited by the RF range capability of the acoustic transducer structure. The full optical range of a typical TAS AOTF design requires an RF bandwidth from 12.4 to 91 MHz, which cannot be readily done with a single transducer structure. The usable fractional bandwidth of the transducer will generally never exceed 100%, and will almost always be less due to practical limitations. It is often desirable to operate a single acousto-optic tunable filter with as large as possible a wavelength coverage and this may require an RF bandwidth greater than 100%. There have been several posed solutions to increasing the bandwidth capability of an acousto-optic device. For example, U.S. Pat. No. 3,759,603 discloses an acousto-optical light deflector having increased bandwidth by the use of providing three transducers along one side of the crystal, which transducers operate at consecutive frequency ranges. Such a structural configuration, however, requires the use of an optical medium of increased dimensions. Typically, as the size of the crystal increases in both length and width, problems are encountered in both the optical quality and mechanical integrity of the medium, and the device fabrication becomes more difficult.

It is, therefore, an object of the present invention to provide an acousto-optic tunable filter configuration in which the range coverage may be doubled without the corresponding increase in crystal size.

SUMMARY OF THE INVENTION

The invention provides an acousto-optic tunable filter configuration and a method for the operation of such an apparatus in which the tuning range is extended. According to the new configuration, a non-collinear acousto-optic tunable filter crystal has a first transducer bonded to one transducer face of the crystal and a single transducer bonded on the opposite crystal face which crystal face is cut so as to be parallel to the first transducer. The first transducer is fabricated to the proper thickness to operate at a center frequency $f_1$ and the second transducer is fabricated so as to operate at a center frequency $f_2$. The method of extending the tuning range of the acousto-optic tunable filter comprises the steps of: introducing incident light into the acousto-optic tunable filter which filter comprises a crystal having an optical input face, an optical output face and first and second parallel sides. Acoustic waves having a center frequency $f_1$ are launched into the crystal from the crystal's first side. These acoustic waves propagate in a first direction such that the interaction of the acoustic wave with the light results in the absorption of a phonon by the incident light. Acoustic waves having a center frequency $f_2$ are launched into the crystal from the crystal's second side. The acoustic waves of a center frequency $f_2$ propagate in a second direction which is anti-parallel to the first direction such that the interaction with the light by the second series of acoustic waves results in the stimulated emission of a phonon.

BRIEF DESCRIPTION OF THE DRAWINGS

The above, as well as other features and advantages of the present invention, will become apparent through consideration of the detailed description in connection with the accompanying drawings in which.

DETAILED DESCRIPTION OF THE INVENTION

Figure 1:
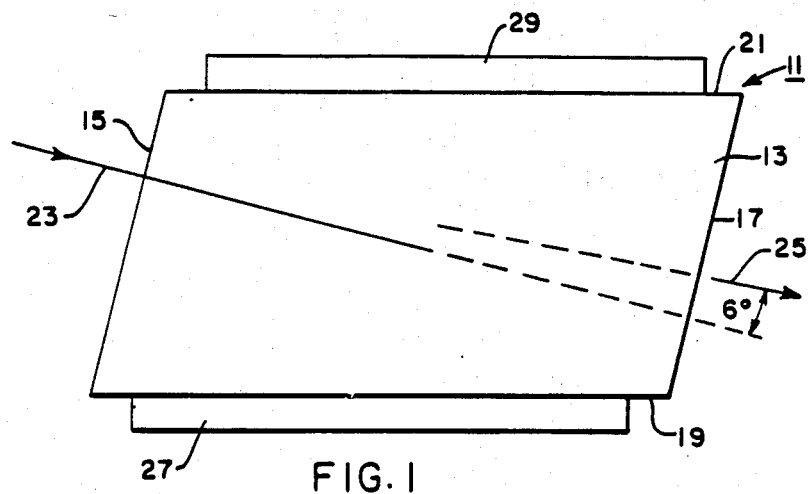
FIG. 1 is a schematic representation of a non-collinear acousto-optic tunable filter illustrating both the structure and functional operation provided by the teachings of this invention.

An acousto-optic tunable filter with two acoustic channels is schematically illustrated in FIG. 1 and generally indicated by the reference character 11. A non-collinear AOTF crystal 13 has an optical input face 15, an optical output face 17, and first and second parallel sides 19 and 21, respectively. The present material of choice for the AOTF crystal 13 is thallium-arsenic-selenide, $Tl_3AsSe_3$. The input optical face 15 of the crystal 13 is cut so as to be normal to the incident light beam 23, while the output beam is diffracted at an angle of about 6° to the incident beam as at 25. The exit optical face 17 is cut so as to be normal to this diffracted beam. A first acoustic transducer 27 is bonded to one of the opposed parallel side surfaces of the crystal 13, as at parallel side 19. The transducer 27 preferably consists of an x-cut lithium niobate crystal plate which is efficiently coupled to the acoustic crystal. A conductive electrode pattern is provided on the lithium niobate transducer substrate. This transducer is driven by an RF system which will be described hereinafter. The acousto-optic crystal 13 is designed such that the crystalline b-c axes are contained in the optical plane of incidence in the crystal and the optical beam is propagated at a selected angle which for the material described above has typically been about 30° relative to the crystallographic c or optic axis. The acoustic energy from the transducer 27 is propagated nearly normal to the optical beam propagation direction. When RF power is applied to the transducer, the input infrared radiation is propagated along a path at a predetermined angle to the optic axis of the crystal and a narrow passband frequency selectively interacts with the acoustic wave. The polarization of this selected or tuned optical frequency radiation is rotated 90° from the unfiltered beam. This selected or tuned narrow passband infrared radiation is also distinguishable from the remaining input radiation because it is shifted or diffracted at a small angle relative to the unaffected input radiation path, such as the 6° offset described above. Thus, the filtered light can be separated either spatially due to this offset angle without the use of an output polarizer or by means of an output polarizer. The angular relationship between the input radiation beam and the crystalline c or optic axis is not critical and can be varied, but variation will affect the specific RF tuning frequency which is used to filter or tune the desired narrow bandwidth wavelength of interest.

Based on the relationship of the crystalline axis and the propagation of sound waves with respect to the incident light in the crystal, it had been believed that only a single transducer acousto-optic tunable filter could function efficiently. As described in the background of the invention portion of the specification, it was the practice to utilize multiple transducers along a single face of the crystal. However, when more than a single transducer was utilized, it was generally necessary to approximately square the volume of the crystal in order to have proper interaction of the acoustic wave with the incident light. The present invention improves upon the acousto-optic tunable filter by providing a single acousto-optic tunable filter crystal in which the wavelength coverage may be doubled over that in the usual configuration, i.e., single transducer, without any increase in crystal size.

The new configuration illustrated in FIG. 1 comprises the non-collinear ATOF crystal in which a transducer is bonded not only on the usual transducer face as at 19 but also on the opposite face 21, which is cut so as to be parallel to the first face. The first transducer is fabricated to the proper thickness to operate at a center frequency $f_1$, and the second transducer 29 on face 21 is fabricated to the proper thickness in order to operate at a center frequency $f_2$. The selected center frequencies may be chosen to yield a continuous range of coverage, or for example, they may be chosen to cover two non-contiguous ranges if that is desirable. For example, two distinct ranges of interest in the infrared are 2 to 5 microns and 8 to 12 microns. The two transducers may be driven from a single RF power source, with appropriate matching electrical network, or it may prove more desirable to drive them independently. A system by which such an acousto-optic filter transducer can be driven is described in the Article entitled "Automated Acousto-Optic Tunable Filter (AOTF) Infrared Analyzer" by K. B. Steinbruegge et al., SPIE Vol. 268, "Imaging Spectroscopy", 1981 which was described above in the discussion of U.S. Pat. No. 4,490,845 and which is incorporated herein by reference.

Figure 2:
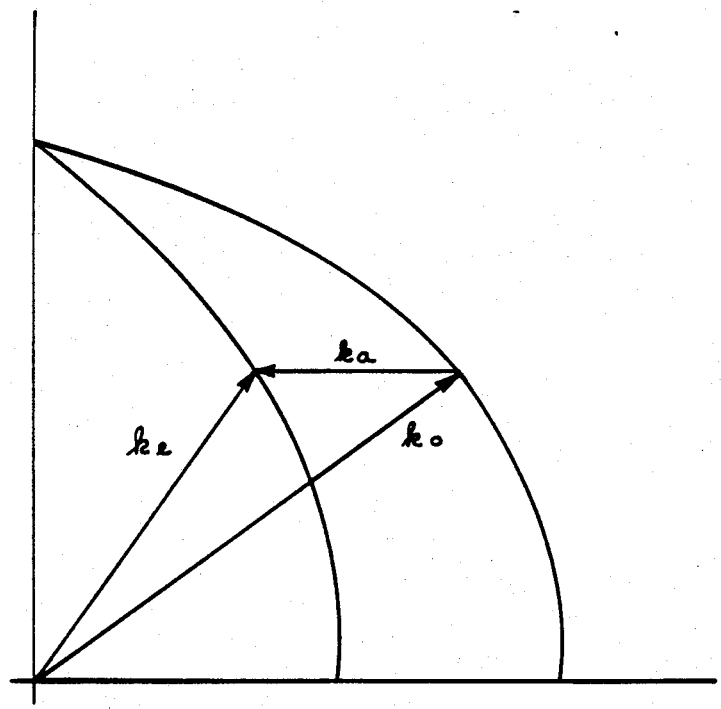
FIG. 2 is a wave vector diagram for acousto-optical interaction in a non-collinear filter utilizing a negative, uni-axial crystal such as thallium-arsenic-selenide.

An understanding of the operation of the acousto-optic tunable filter according to this invention requires a description of vector phase matching properties between the optical and acoustic waves. The wave vector diagram for a negative, uni-axial crystal such as the thallium-arsenic-selenide crystal, is shown in FIG. 2. As illustrated in this vector diagram, the incident light is O-polarized, and the filtered light is E-polarized, and conservation of momentum is satisfied for the acoustic wave propagating right to left. For this case, conservation of energy would require that the diffracted, i.e., filtered light be higher in frequency than the incident light by an amount equal to the acoustic frequency. This can be considered roughly analogous to a doppler shift. For a two-transducer AOTF as described above, the direction of propagation of the acoustic wave from the second transducer is anti-parallel to that of the first transducer. It would thus appear that in order to satisfy conservation of momentum, the incident light must be E-polarized and filtered light O-polarized. If this were the case, the AOTF could not operate with both acoustic channels, since the incident light polarization must be only one or the other. However, we have found that this is not the case. This is based in the fact that quantum mechanics dictates that the probability of an acoustic phonon being absorbed (O-polarization→to E-polarization) is essentially equal to the probability of a phonon being emitted. The only difference is that for the latter process, the frequency of the diffracted light would be reduced by the acoustic frequency. For most acousto-optic tunable filter operations, the small difference in optical frequency will be of no consequence. The crucial result obtained through the use of this invention is that an acousto-optic tunable filter may be presented with light of either E-polarization or O-polarization, and the tuning relationship will be satisfied for an acoustic wave propagating at the optimized direction, or anti-parallel to it as from the second transducer on the opposite face of the crystal.

The use of the two-transducer structure described above provides a method for extending the tuning range of an acoustic optic filter. One transducer operates the acousto-optic tunable filter by an interaction with the light wave involving the absorption of a phonon. The opposite transducer operates the AOTF by the stimulated emission of a phonon. By constructing these two transducers to cover different acoustic wavelength ranges, the light wavelength coverage of the acousto-optic tunable filter is extended. The increased light wavelength coverage is obtained without the use of an increased crystal size which necessitates the production of optically pure and mechanically strong crystals as well as the obvious increase device size. What has been described is an improved acousto-optic tunable filter with two acoustic channels provided through the use of transducers disposed on opposed parallel faces of the crystal.

What is claimed is:

1. A method of extending the tuning range of a non-collinear acousto-optic tunable filter without a corresponding increase in the size thereof, comprising the steps of:

introducing incident light into the acousto-optic tunable filter comprising a crystal having an optical input face which is normal to said incident light, an optical output face which is normal to a selected diffracted passband of said incident light, and first and second parallel sides;

selectively launching acoustic waves having a center frequency $f_1$ into said crystal from said crystal first side, which acoustic waves are propagating in a first direction so that interaction with said incident light results in the absorption of a phonon; and selectively launching acoustic waves having a center frequency $f_2$ into said crystal from said crystal second side, which acoustic waves propagate in a second direction which is anti-parallel to said first direction such that interaction with said incident light results in the stimulated emission of a phonon, wherein the interaction of the acoustic waves with said incident light distinguishes the selected passband of said incident light from the remaining incident light through diffraction of the selected passband of incident light relative to the remaining incident light.

2. A non-collinear acousto-optic tunabler filter having extended tuning range without a corresponding increase in the size thereof, comprising:

a crystal having an optical input face which is normal to said incident light, an optical output face which is normal to a selected diffracted passband of said incident light, and first and second parallel sides which serve as transducer faces;

a first transducer means of a predetermined thickness for operating at center frequency $f_1$ mounted on said first parallel side; and a second transducer means of a predetermined thickness for operating at a center frequency $f_2$ mounted on said second parallel side; wherein acoustic waves launched into said crystal from said first transducer means propagate in a first direction so that interaction with incident light in said crystal results in the absorption of a phonon and acoustic waves launched into said crystal from said second transducer means propagate in a second direction which is anti-parallel to said first direction such that interaction with said incident light results in the stimulated emission of a phonon, and wherein the interaction of the acoustic waves with said incident light distinguishes the selected passband of said incident light from the remaining incident light through diffraction of the selected passband of incident light relative to the remaining incident light.

* * * * *